Chas. R. Ely's Imp'd Saw Mill Gauge.

PATENTED DEC 17 1867

No. 72380

Witnesses
Y. B. Kidder
M. W. Frothingham

C. R. Ely, by
Crosby, Halsted & Gould
Att'ys.

United States Patent Office.

CHARLES R. ELY, OF NORTHFIELD, VERMONT.

Letters Patent No. 72,380, dated December 17, 1867.

IMPROVEMENT IN HEAD-BLOCKS FOR SAW-MILLS.

*The Schedule referred to in these Letters Patent and making part of the same.*

TO ALL WHOM IT MAY CONCERN:

Be it known that I, CHARLES R. ELY, of Northfield, in the county of Washington, and State of Vermont, have invented certain new and useful Improvements in Saw-Mill Gauges; and I do hereby declare that the following, taken in connection with the drawings which accompany and form part of this specification, is a description of my invention sufficient to enable those skilled in the art to practise it.

This invention relates to the means, shown and described, for setting lumber, with reference to the saw of a saw-mill, so that the gauge-faces, which operate to force the lumber toward the plane of the traverse of the saw, shall move parallel to said plane, and toward and from it, at each movement, such a distance as the sawyer may desire, the distance of such movement being the thickness of the board or plank cut from the log or timber plus the thickness of the saw-kerf. The drawings show an illustration of an embodiment of my invention—

Figure 1:
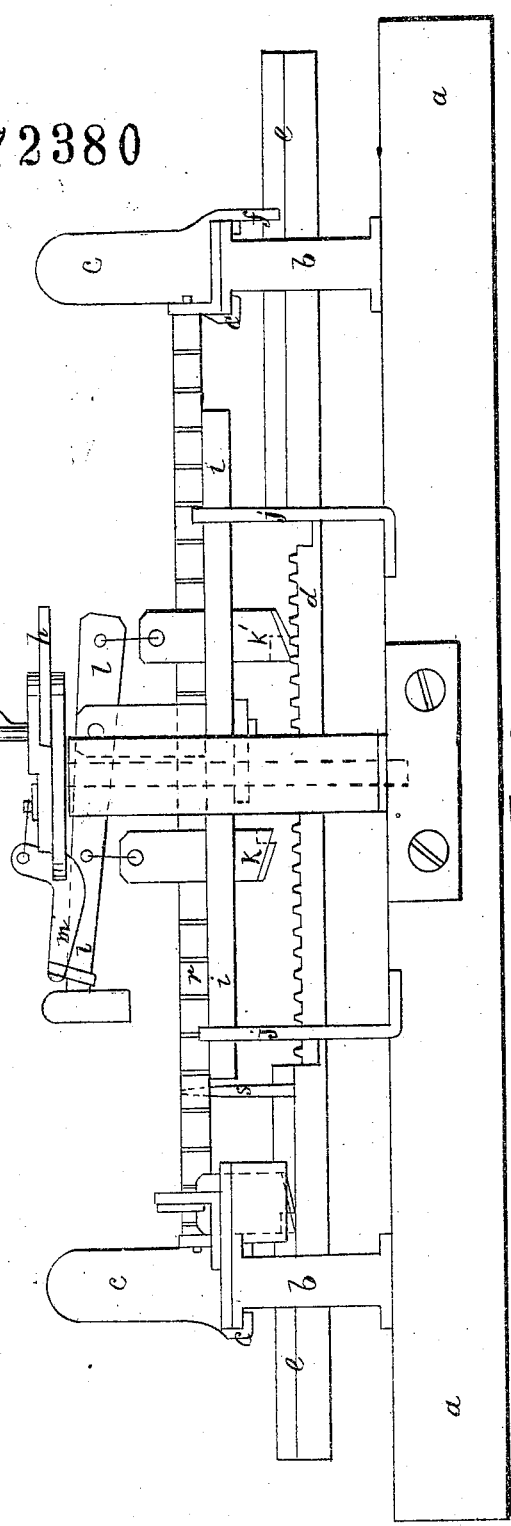
Figure 2:
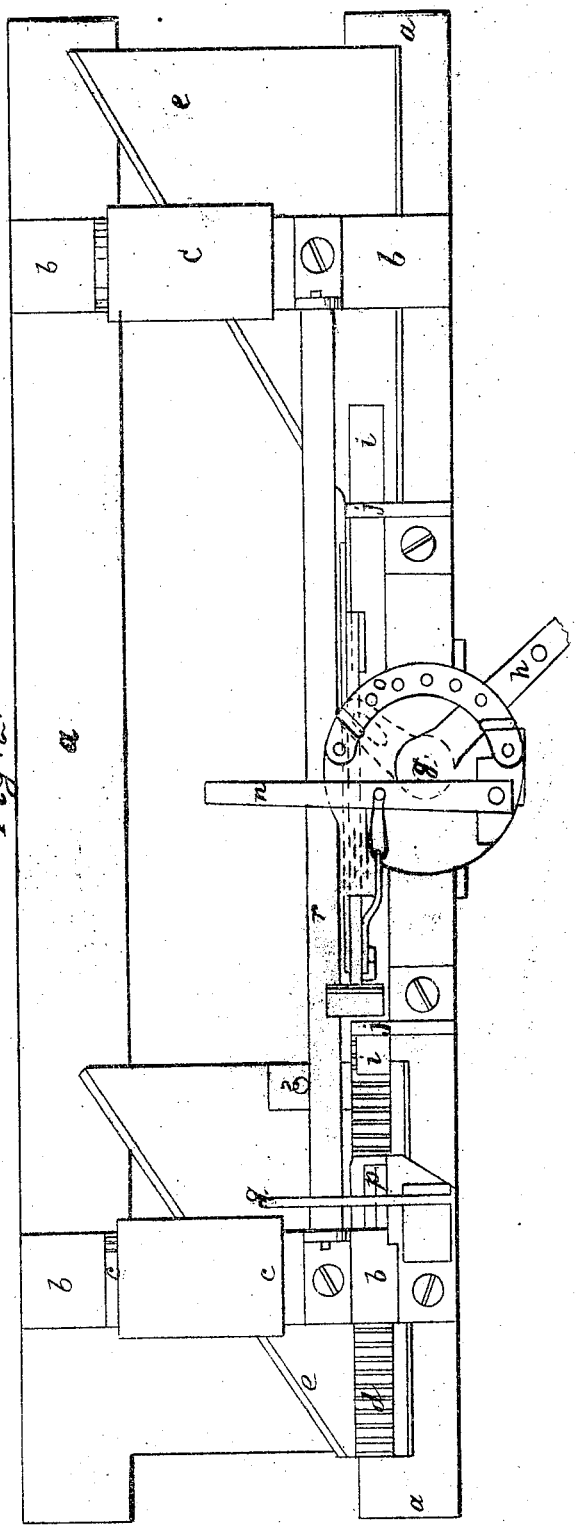

Figure 1 being an elevation of the side of my apparatus most remote from the saw, and Figure 2 being a plan of the apparatus.

$a$ is the frame, on which my apparatus is mounted, which frame may be a part of the saw-frame, (usually the frame of a circular-saw bench,) or it may be attached to the saw-frame, so as to move to feed or carry the timber longitudinally, as well as to serve its special purpose of transverse adjustment of the timber with reference to the plane of the saw's movement. On the cross-pieces, $b$, of this frame are the gauge-rests $c$, which abut against the material to be sawed with their outer vertical faces. Beneath the surfaces of the cross-pieces $b$, on which the gauges $c$ slide, and arranged parallel with the vertical faces of the gauges, is a rack-bar, $d$, to which are connected the inclines $e$, so that they move with the bar, while, from the gauges, there are forked projections, $f$, which embrace upright flanges on the inclines, so that, whenever the bar $d$ and flanged inclines $e$ are moved, movement of the gauges $c$ results, either towards or from the saw, according to the direction of movement imparted to said bar. The incline-plates $e$ have, in addition to the up-turned flange on their inclined sides, flanges also on the opposite straight sides. These flanges serve a most important purpose, in contributing towards the steadiness of action of the parts, and in insuring against any forcing of the gauges or knees $c$ out of true position when in the act of sawing.

The flanges on the sides which are not inclined ride snugly in grooves in the head-block, thus absolutely forbidding any motion of the rack or slide in a direction across the frame. The advantage and effect of this novel construction of my double-flanged slide is, that any accidental disposition of the log to get out of true, when the saw tends to "draw on," and the consequent tendency to make an untrue and crooked cut, are prevented, the down-turned flange holding tight the rack and plate, and the up-turned flange holding tight the gauge or knee, so that no play is allowed to either.

The advantages of having the rack and incline rigidly connected together are apparent. One bar thus answers both for the connection, and also as the means for actuating the inclines, thus dispensing with any additional or complicated devices, which not only increase the liability to derangement, but also tend to make the extent of movement of the log at one end vary from that at the other end.

The simplicity and precision of action with my construction thus enhance, to a great degree, the value and efficiency of the machine. The rack, also moving in the same line with the inclines, and in the line of its length, has no opportunity of getting twisted or diverted from its correct path, and it compels both inclines to act in perfect harmony with each other, as each must advance its end or portion of the log precisely the same measured distance, and at precisely the same instant, and remain at rest for exactly the same length of time.

When two or more racks are used, arranged at right angles to the line of the bar which carries the inclines, and not connected with it, and each is impelled by its own pawl or set of pawls, not only may one rack fail to act in harmony with the other, in case the teeth of both are not taken by them simultaneously and acted upon precisely alike, but the connections of these additional parts also tend to disturb true and uniform movements, for it is self-evident that the greater the number and complications of the devices, the less reliance can be placed on getting true movements.

Furthermore, the arrangement of my rack-bar so that it can have no motion, except in a line parallel with that of the log, positively precludes the possibility of one end being pulled out of place, when commencing to saw, in case a knot or crooked grain is encountered. When, however, the racks have a motion in a line transverse of the length of the log, and the saw tends to "draw on," it will do so, and draw the rack out of its true position. My rack absolutely resists and defeats such disposition to "draw on," and it remains immovable, and must hold firmly both the inclines and the knees.

The mechanism for imparting movement to the bar $d$ is as follows: The vertical shaft $g$ has upon it a hand-lever, $h$, by which, through any suitable connection convenient to the sawyer, he is enabled to rock or partially rotate said shaft, which has also thereupon an arm, seen in dotted lines in fig. 2, which arm takes hold upon a pin fixed in a bar, $i$, arranged over the rack-bar, so that it can be reciprocated in guides $j$ by the rocking movements imparted to shaft $g$. In mortises in the bar $i$, and capable of free vertical sliding motion therein, are pieces, $k$, which act on the rack-teeth as pawls, one set of these pieces being shaped so as when bar $i$ is moved, to propel the rack-bar in one direction, while the other set is so shaped as to propel the rack-bar in the other direction, as will be readily understood from inspection of fig. 1. To provide that one set only of the pawls $k$ shall be in position to operate on the rack-bar $d$, both sets of pawls are hung from a pivoted lever, $l$, the pivot of said lever being between the points of suspension of the pawls, so that when one set of pawls is placed in gear with the rack-teeth, the other set is necessarily out of gear therewith. To enable the sawyer to place either set of pawls in gear with the rack-teeth, and so determine that the gauges shall be brought toward the saw, or shall be carried back therefrom by vibrations of lever $h$, the bent lever $m$ is arranged so that it can lift the lever $l$, which is weighted at one end, the bent lever $m$ being so connected with the lever $n$ that it is moved by change of position of $n$, which is extended so as to be within convenient reach of the sawyer.

It will be obvious, on inspection of the drawings, that the position of lever $n$ determines which of the two sets of pawls, $k$, is in gear with the rack-bar.

Over the lever $h$ is a segment-bar, $o$, provided with holes and pins, as seen in fig. 2, by which the extent of vibration of the lever $h$ can be fixed, and, consequently, the amount of movement given to the gauge determined. As arranged in the drawings, the pawls marked $k'$ are the pawls which operate to move the gauges forward to the saw.

To prevent any slipping back of the bar, when it is moved by pawls $k'$, another set of pawls, $p$, not connected with the movable bar $i$, is arranged so that when pawls $k'$ are operating, the pawls $p$ shall also act, but simply as detaining-pawls, and so that, when pawls $k$ are in operation, to move back the gauges, the pawls $p$ can be lifted clear of the rack-bar by means of the lever $q$.

As a matter of convenience, when sawing stock of various thicknesses, I arrange a scale-bar, $r$, so that it can be rotated to show the various scales marked on the several sides of the bar, so that any scale desired may be brought adjacent to the index-finger $s$, which moves with the rack-bar and inclines.

The holes in the segment are so made that, by shifting the pins therein, and vibrating the lever $h$ so that it shall strike against both pins, given and desired movements of the gauges may be obtained for the cutting of any given and desired thickness of boards or planks from the lumber operated upon, or the pins may be dispensed with, and the index-finger and scale-bar may be relied upon to determine the distance moved by the gauges.

To move forward the gauges, raise, by means of lever $n$, the weighted end of lever $l$, and then the pawls $k'$, being in gear with the rack-bar $d$, vibration of lever $h$ will move the gauges forward at each double stroke of lever $h$, a distance determined by the position of the pins in the segment $o$, or a distance determined by observation of the index-finger $s$, against a scale on the bar $r$.

To move back the gauges, drop the weighted end of lever $l$, by movement of lever $n$, raise the detaining-pawls $p$, and vibrate lever $h$.

1. I claim, in combination with the transverse gauges of a saw-mill, the position of which determines the thickness of the material cut from the stock, the pawls $k$ and $k'$, when arranged to operate substantially as described.

2. Also, a rack-bar, carrying two or more inclines rigidly secured thereto, substantially as and for the purpose set forth.

3. Also, the plates, constructed substantially as described, having a flange turned up in one direction on the inclined side, and a flange turned parallel with the rack-bar on the straight side, and applied substantially as and for the purpose set forth.

4. Also, in combination with the pawls $k'$, the detaining-pawls $p$, when constructed and arranged to operate, in connection with inclines and gauges, substantially as described.

5. Also, the combination of the pawls $k'$ $k$, their traversing-bar, and their supporting-lever, with the lever $h$, and its indicating-segment and pins, constructed and operating substantially as described.

6. Also, in combination with the transverse gauges, the index-finger and rotary scale, constructed and operating substantially as set forth.

CHARLES R. ELY.

Witnesses:
  PERLEY BELKNAP,
  GEORGE M. FISK.